United States Patent
Agin (10) Patent No.: US 7,626,970 B2
(45) Date of Patent: Dec. 1, 2009

(54) METHOD OF CONTROLLING TRANSMISSION POWER IN A MOBILE RADIO SYSTEM

(75) Inventor: Pascal Agin, Sucy En Brie (FR)

(73) Assignee: Alcatel, Paris (FR)

( * ) Notice: Subject to any disclaimer, the term of this patent is extended or adjusted under 35 U.S.C. 154(b) by 860 days.

(21) Appl. No.: 09/878,269

(22) Filed: Jun. 12, 2001

(65) Prior Publication Data

US 2002/0003785 A1 Jan. 10, 2002

(30) Foreign Application Priority Data

Jun. 13, 2000 (FR) .................................. 00 07534

(51) Int. Cl.
*H04B 7/216* (2006.01)
(52) U.S. Cl. .................... 370/342; 455/522; 370/335
(58) Field of Classification Search ................ 370/328, 370/329, 335, 342, 441; 455/11.1, 12.1, 455/13.4, 500, 507, 517, 522
See application file for complete search history.

(56) References Cited

U.S. PATENT DOCUMENTS

| | | | | |
|---|---|---|---|---|
| 5,883,899 | A * | 3/1999 | Dahlman et al. ............. | 370/468 |
| 6,128,506 | A * | 10/2000 | Knutsson et al. ............ | 455/522 |
| 6,173,162 | B1 * | 1/2001 | Dahlman et al. .............. | 455/69 |
| 6,181,738 | B1 * | 1/2001 | Chheda et al. ............... | 375/224 |
| 6,337,989 | B1 * | 1/2002 | Agin ........................... | 455/522 |
| 6,549,785 | B1 * | 4/2003 | Agin ........................... | 455/522 |
| 6,556,838 | B1 * | 4/2003 | Baker et al. .................. | 455/522 |
| 6,564,067 | B1 * | 5/2003 | Agin ........................... | 455/522 |
| 6,603,773 | B2 * | 8/2003 | Laakso et al. ............... | 370/441 |
| 6,738,640 | B1 * | 5/2004 | Baker et al. .................. | 455/522 |
| 6,754,505 | B1 * | 6/2004 | Baker et al. .................. | 455/522 |

FOREIGN PATENT DOCUMENTS

| | | |
|---|---|---|
| EP | 0 949 830 A2 | 10/1999 |
| EP | 0 984 581 A1 | 3/2000 |
| EP | 0 994 576 A2 | 4/2000 |
| EP | 1 069 704 A1 | 1/2001 |
| WO | WO 98/58461 | 12/1998 |

\* cited by examiner

*Primary Examiner*—Bob A Phunkulh
(74) *Attorney, Agent, or Firm*—Sughrue Mion, PLLC

(57) ABSTRACT

A method of controlling transmission power in a mobile radio system in which a power control algorithm controls transmission power as a function of a transmission quality target value, wherein a target value is varied to compensate the effects of a compressed transmission mode in which transmission is interrupted during transmission gaps and the bit rate is increased correspondingly to compensate the transmission gaps. The target value variation includes a first component for compensating the effects of the increase in bit rate and a second component for compensating other effects of transmission gaps. A corresponding anticipated variation of the transmission power is applied, and the anticipated variation of the transmission power corresponds to an approximate value of the target value variation obtained by a process of approximation from the second component.

31 Claims, 5 Drawing Sheets

FIG_1

FIG_2

FIG_4

FIG_5

FIG_6

METHOD OF CONTROLLING TRANSMISSION POWER IN A MOBILE RADIO SYSTEM

The present invention relates generally to mobile radio systems, and in particular to code division multiple access (CDMA) systems.

The invention applies in particular to third generation systems including the universal mobile telecommunication system (UMTS).

BACKGROUND OF THE INVENTION

Generally speaking, in third generation systems, one objective is to improve performance, and in particular to increase capacity and/or to improve quality of service.

One technique widely used is known as power control, and in particular as closed loop power control.

The objective of closed loop power control is to maintain a parameter representative of the transmission quality on each link between a base station and a mobile station, for example the signal-to-interference ratio (SIR), as close as possible to a target value. The mobile station periodically estimates the SIR in the downlink direction, i.e. in the direction from the base station to the mobile station, for example, and compares the estimated SIR to the target SIR. If the estimated SIR is less than the target SIR, the mobile station requests the base station to increase its transmission power. On the other hand, if the estimated SIR is greater than the target SIR, the mobile station requests the base station to reduce its transmission power.

The target SIR is an important parameter in such systems. If the target SIR is set at a value greater than that which is strictly necessary, the level of interference in the system is increased unnecessarily, and the performance of the system is therefore degraded unnecessarily; on the other hand if the target SIR is set at a value less than that which is strictly necessary, the quality of service on the link in question is degraded.

The target SIR is generally chosen as a function of the required quality of service and is routinely adjusted by an external loop algorithm (as opposed to the algorithm previously referred to, which is an internal loop algorithm). The principle of the external loop algorithm is to estimate the quality of service regularly and to compare the estimated quality of service with the required quality of service. The quality of service is generally represented by a bit error rate (BER) or a frame error rate (FER) for voice services or by a block error rate (BLER) for packet-mode data services. If the estimated quality of service is lower than the required quality of service, the target SIR is increased; if not, the target SIR is reduced.

Unlike the internal loop algorithm, which must be relatively fast to track variations in the SIR as closely as possible, the external loop algorithm must be relatively slow, because the quality of service must be averaged over a period to obtain a reliable estimate. In systems like the UMTS in which information transmitted is structured in frames which are in turn structured in time slots, the SIR of the received signal is typically estimated and compared with the target SIR in each time slot of a frame and the quality of service is averaged over several frames.

The relative slowness of the external loop algorithm can cause problems, however, especially if the required quality of service changes, for example:

- in the event of a change of transmission mode from an uncompressed mode to a compressed mode, or vice versa,
- in the event of a change of the service required (in particular a change of transmission bit rate),
- in the event of a change of transmission bit rate for a given required service (for example for packet-mode data services),
- in the event of a change in environmental conditions (for example a change in the speed of the mobile, a change in radio propagation conditions, etc.), etc.

In the following description, the emphasis is more particularly on control problems caused by using the compressed mode.

Figure 1:
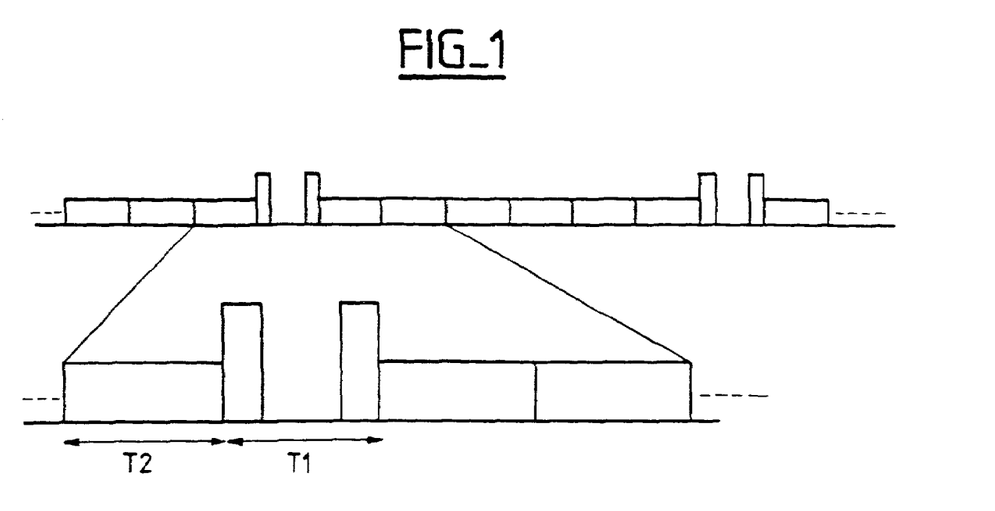
FIG. 1 is a diagram showing the principle of compressed mode transmission.

In a system like the UMTS, for example, the compressed mode has been introduced in the downlink direction to enable a mobile station, also referred to as a user equipment (UE), to perform measurements on a frequency different from its uplink transmission frequency, and essentially consists of stopping transmission in the downlink direction for the duration of a predetermined transmission gap. This is outlined in FIG. 1, which applies to the situation in which the information transmitted is structured in frames and shows a series of successive frames including compressed frames (for example the frame T1) and uncompressed frames (for example the frame T2).

The instantaneous bit rate is increased in a frame which has been compressed by increasing the coding rate or by reducing the spreading factor, and the target SIR must therefore be increased in approximately the same proportion.

Also, as closed loop power control is no longer active during a transmission gap, performance is significantly degraded, mainly, as the applicant has found, during a compressed frame and during one or more frames referred to as "recovery frames" following the compressed frame. The degradation can be as much as several decibels. To retain the same quality of service as in the normal (uncompressed) mode, this effect must also be compensated by increasing the target SIR during these frames.

However, because the external loop algorithm is relatively slow, several frames will probably be necessary before changing the target SIR correspondingly, and the target SIR may even be increased just after the compressed or recovery frames, at a time when the increase is no longer required, which degrades performance in all cases.

European Patent Applicant No. 99401766.3 filed 13 Jul. 1999 by the applicant proposes a solution that avoids degraded performance in compressed mode.

Briefly, the basic idea of the earlier application is to anticipate the target SIR variation, i.e. to apply a corresponding variation $\Delta$SIR to the target SIR in advance.

Another idea set out in the earlier application is to separate the increase in the target SIR due to the increase in the instantaneous bit rate and the increase $\delta$SIR in the target SIR due to degraded performance in compressed frames, i.e. due to transmission gaps.

For the downlink direction, for example, since the user equipment knows the bit rate variation, only the increase $\delta$SIR in the target SIR due to degraded performance in compressed frames has to be signaled to the user equipment by the network. The additional signaling resources needed can be small if the variation is signaled with other compressed mode parameters, including the duration of the transmission gaps, their period, etc.

The user equipment can increase the target SIR by $\Delta$SIR just before the compressed frame or just after transmission of the compressed frame is interrupted and reduce it by the same amount just after the compressed frame. This target SIR variation is added to the conventional external loop algorithm, which must take it into account.

Another idea set out in the earlier application is that performance in the recovery frames can also be degraded because of the interruption in power control during the transmission gap, at least when the transmission gap is at the end of a compressed frame. It would therefore also be desirable to increase the target SIR during the recovery frames and to signal this target SIR increase to the user equipment. Alternatively, to reduce the amount of signaling needed, the same $\delta SIR$ value could be used as for the compressed frames.

Thus, according to the earlier application, anticipating the target SIR variation during compressed and recovery frames increases the efficiency of the external power control loop in the compressed mode.

Another idea set out in the earlier application is for the user equipment to simultaneously increase its transmission power in the same proportion before the compressed frame and likewise reduce it in the same proportion after the compressed frame. This avoids problems caused in particular by the step mode operation of the internal loop algorithm and the new target SIR value is therefore reached faster (if the target SIR variation is 5 dB and if the power control step is 1 dB, then the conventional internal loop algorithm would require five time slots to reach the new target value, for example).

Thus, according to the earlier application, additionally anticipating the transmission power variation also increases the efficiency of the internal power control loop in the compressed mode.

A problem can nevertheless arise in obtaining an anticipated variation of the transmission power corresponding to the target SIR variation. Because in practice the entity of the system in charge of determining and/or applying the anticipated variation of the transmission power is not necessarily the same as the entity of the system in charge of determining and/or applying the target SIR variation, the variations determined and/or applied in this way by the different entities can be different, and performance can then be degraded.

Figure 3:
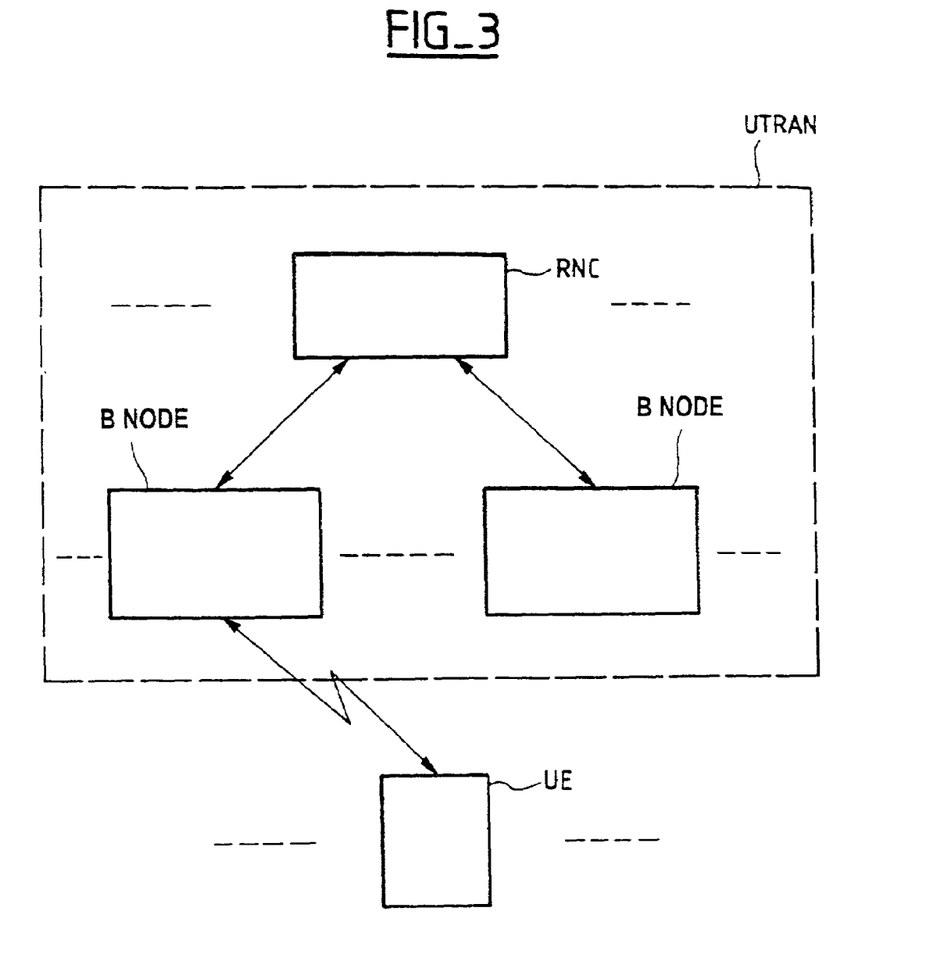
FIG. 3 outlines the general architecture of a mobile radio system.

Generally speaking, and as outlined in FIG. 3, a mobile radio system includes the following entities: mobile stations, for which the UMTS term is "user equipment" (UE), base stations, for which the UMTS term is "B node", and base station controllers, for which the UMTS term is "radio network controller" (RNC). The combination of the B nodes and the radio network controllers is called the UMTS terrestrial radio access network (UTRAN).

The external power control loop is generally in the receiver, in the downlink user equipment, for example, because it is more logical to estimate the required quality of service (BER, FER, BLER, etc.) using the external loop in the receiver. The receiver then knows the target value variation $\Delta SIR$. On the other hand, the anticipated variation of the transmission power must be applied in the transmitter, in the downlink B node, for example, and must therefore also be known to the sender.

Also, in a system like the UMTS, the radio network controller is responsible for network control and for controlling the actions of the user equipment, and the B node is principally a transceiver. The uplink external power control loop is therefore in the radio network controller. The internal power control loop is partly in the user equipment and partly in the B node; for example, for transmission in the uplink direction, the B node compares the estimated SIR with the target SIR and sends a power control command to the user equipment. The user equipment modifies its transmission power as a function of power control commands sent by the B node. The downlink external power control loop is in the user equipment (some parameters needed to determine $\Delta SIR$, such as the parameter $\delta SIR$ previously referred to, are signaled to the user equipment by the radio network controller). For this reason, the B node does not know the value of $\Delta SIR$ for the downlink direction, including the component $\delta SIR$ signaled to the user equipment by the radio network controller. It knows only the value $\Delta SIR$ for the uplink direction.

For the downlink direction, one solution to this problem would be for the radio network controller to signal the parameter $\delta SIR$ needed to determine the target SIR variation not only to the user equipment but also the B node.

However, this kind of solution has the disadvantage of significantly increasing the amount of signaling that has to be exchanged and therefore of not using the available transmission resources efficiently.

There is therefore a requirement for a solution that could avoid such drawbacks or, more generally, that could reduce the amount of signaling required without degrading performance.

In a system like the UMTS in particular, different channels called "dedicated physical channels" can be transmitted simultaneously on the same physical channel.

There are two types of dedicated physical channel:
dedicated physical data channels (DPDCH), and
dedicated physical control channels (DPCCH).

Each user equipment in connected mode is allocated a DPCCH and one or more DPDCH, as required.

Figure 2:
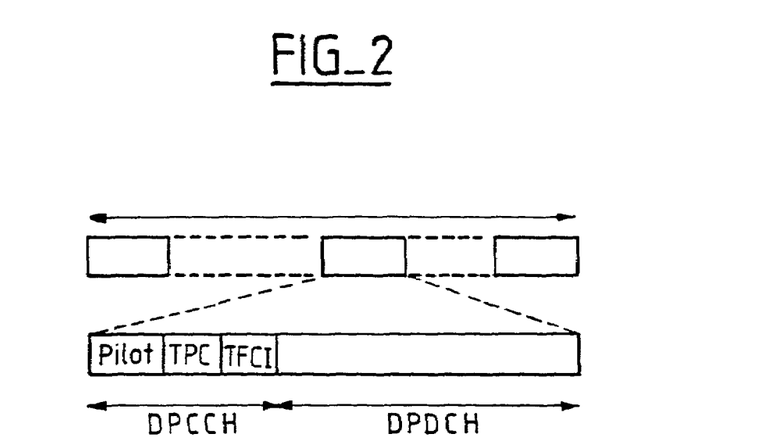
FIG. 2 is a diagram showing a frame structure in a system such as the UMTS.

In the downlink direction, for example, the DPDCH and the DPCCH are time-division multiplexed in each time slot of a frame, as shown in FIG. 2.

As also shown in FIG. 2, the DPCCH includes three fields:
a Pilot field containing a pilot signal enabling the mobile station to remain synchronized with the network and to estimate the propagation channel,
a transmit power control command field TPC containing power control command bits to be used by the internal power control loop, and
a transport format combination indicator field TFCI containing transport format indicator bits which, indicate the transport format used for each DPDCH, including in particular the coding, interleaving, etc. scheme, which depends on the corresponding service.

As described in section 5.2.1.1 of the document 3G TS 25.214 V3.2.0 (2000-03) published by 3GPP ("$3^{rd}$ Generation Partnership Project"), the power control algorithm simultaneously controls the power of the DPCCH and the DPDCH and the transmission power of each of the TFCI, TPC and Pilot fields is offset relative to the transmission power of the DPDCH by a respective offset PO1, PO2, PO3 determined by the network.

However, problems can arise if this technique is used in combination with the technique of anticipating the variation of the transmission power, as described in the earlier application previously referred to, but it was not the main aim of the earlier application to solve those problems. In particular, the transmission power for at least one of the fields of the DPCCH can momentarily become greater than would strictly be necessary, leading to an unnecessary increase in the level of interference in the network and/or an unnecessary reduction in network capacity, together with an unnecessary increase in power consumption in the sender concerned.

There is also a need for a solution that could avoid such problems, or more generally that could obtain optimum anticipated variations of the transmission power for each field or channel.

OBJECTS AND SUMMARY OF THE INVENTION

The present invention provides a method of controlling transmission power in a mobile radio system in which a power control algorithm controls transmission power as a function of a transmission quality target value, wherein:

a target value variation is applied to compensate the effects of a compressed transmission mode in which transmission is interrupted during transmission gaps and the bit rate is increased correspondingly to compensate the transmission gaps, said target value variation includes a first component for compensating the effects of said increase in bit rate and a second component for compensating other effects of transmission gaps, a corresponding anticipated variation of the transmission power is applied, and said anticipated variation of the transmission power corresponds to an approximate value of said target value variation obtained by a process of approximation from said second component.

According to another feature, an approximate value of said second component for a given transmission direction is obtained from the second component for the opposite transmission direction.

According to another feature:

said power control algorithm simultaneously controls the transmission power of at least two channels, including a data channel and a control channel, as a function of a transmission quality target value, the transmission power of said control channel is offset relative to the transmission power of said data channel, and in the event of target value variation, anticipated variations of the transmission power of the data channel and/or the transmission power of the control channel and/or the offset of the transmission power of the control channel relative to the transmission power of the data channel are applied in order to obtain an anticipated variation of the transmission power of the data channel that corresponds to said approximate value of the target value variation.

According to another feature, in the event of target value variation, said anticipated variations of the transmission power of the data channel and/or of the transmission power of the control channel and/or of the offset of transmission power of the control channel relative to the transmission power of the data channel are determined so that the power of the signal transmitted on the control channel is the same before and after said target value variation and over the same reference period.

In one embodiment, in the event of target value variation, an anticipated variation of the offset of the transmission power of the control channel relative to the transmission power of the data channel is applied that corresponds to the opposite of said approximate value of the target value variation.

In another embodiment, in the event of target value variation, an anticipated variation of the transmission power of the data channel and the transmission power of the control channel is applied that corresponds to said approximate value of the target value variation.

According to another feature said target value is adjusted by an adjustment algorithm as a function of a required quality of service and said target value variation is intended, in the event of a change to the required quality of service, to anticipate the corresponding target value variation adjusted by said adjustment algorithm.

The invention also provides a mobile radio system including, for implementing a method according to the invention, means for applying, in the event of target value variation, an anticipated variation of the transmission power that corresponds to said approximate value of the target value variation.

According to another feature, said system includes means for applying, in the event of target value variation, anticipated variations of the transmission power of the data channel and/or the transmission power of the control channel and/or the offset of the transmission power of the control channel relative to the transmission power of data channel to obtain an anticipated variation of the transmission power of the data channel that corresponds to said approximate value of the target value variation.

According to another feature, said system further includes means such that, in the event of target value variation, said anticipated variations of the transmission power of the data channel and/or the transmission power of the control channel and/or the offset of the transmission power of the control channel relative to the transmission power of the data channel cause the signal transmitted on the control channel to have the same power before and after said target value variation and over the same reference period.

One embodiment of said system includes means for applying, in the event of target value variation, an anticipated variation of the offset of the transmission power of the control channel relative to the transmission power of the data channel that corresponds to the opposite of said approximate value of the target value variation.

Another embodiment of said system includes means for applying, in the event of target value variation, an anticipated variation of the transmission power of said data channel and the transmission power of said control channel that corresponds to said approximate value of the target value variation.

The invention further provides a base station including, for implementing a downlink power control method according to the invention, means for applying, in the event of target value variation, an anticipated variation of the transmission power that corresponds to said approximate value of the target value variation.

According to another feature said base station includes means for applying, in the event of target value variation, anticipated variations of the transmission power of the data channel and/or the transmission power of the control channel and/or the offset of the transmission power of the control channel relative to the transmission power of the data channel to obtain an anticipated variation of the transmission power of the data channel that corresponds to said approximate value of the target value variation.

According to another feature said base station further includes means such that, in the event of target value variation, said anticipated variations of the transmission power of the data channel and/or the transmission power of the control channel and/or the offset of the transmission power of the control channel relative to the transmission power of the data channel cause the signal transmitted on the control channel to have the same power before and after said target value variation and over the same reference period.

One embodiment of said base station includes means for applying an anticipated variation of the offset of the transmission power of the control channel relative to the transmission power of the data channel that corresponds to the opposite of said approximate value of the target value variation.

Another embodiment of said base station includes means for applying an anticipated variation of the transmission power of said data channel and the transmission power of said control channel that corresponds to said approximate value of the target value variation.

The invention further provides a base station including, for implementing an uplink power control method according to the invention, means for using said second component which is signaled to it by a base station controller for the purposes of uplink power control to determine said approximate value of the downlink target value variation.

The invention further provides a mobile station including, for implementing an uplink power control method according to the invention, means for applying, in the event of target value variation, an anticipated variation of the transmission power that corresponds to said approximate value of the target value variation.

According to another feature said mobile station includes means for applying, in the event of target value variation, anticipated variations of the transmission power of the data channel and/or the transmission power of the control channel and/or the offset of the transmission power of the control channel relative to the transmission power of the data channel to obtain an anticipated variation of the data channel transmission power that corresponds to said approximate value of the target value variation.

According to another feature said mobile station further includes means such that in the event of target value variation said anticipated variations of the transmission power of the data channel and/or the transmission power of the control channel and/or the offset of the transmission power of the control channel relative to the transmission power of the data channel cause the signal transmitted on the control channel to have the same power before and after said target variation and over the same reference period.

One embodiment of said mobile station includes means for applying an anticipated variation of the offset of the transmission power of the control channel relative to the transmission power of the data channel that corresponds to the opposite of said approximate value of the target value variation.

Another embodiment of said mobile station includes means for applying an anticipated variation of the transmission power of said data channel and the transmission power of said control channel that corresponds to said approximate value of the target value variation.

The invention further provides a mobile station including means for using said second component which is signaled to it by a base station controller for the purposes of uplink power control to determine said approximate value of the downlink target value variation.

The invention further provides a base station controller including, for implementing the method according to the invention, means for signaling the same value for said second component for both transmission directions to a base station and to a mobile station.

BRIEF DESCRIPTION OF THE DRAWINGS

Other objects and features of the present invention will become apparent on reading the following description of embodiments of the invention, which description is given with reference to the accompanying drawings, in which.

MORE DETAILED DESCRIPTION

The present invention relates to power control in a mobile radio system.

The present invention relates more particularly to a method of controlling transmission power in a mobile radio system in which a power control algorithm controls the transmission power as a function of a transmission quality target value.

In accordance with the invention:
  a target value variation is applied to compensate the effects of a compressed transmission mode in which transmission is interrupted during transmission gaps and the bit rate is increased correspondingly to compensate the transmission gaps,
  said target value variation includes a first component for compensating the effects of said increase in bit rate and a second component for compensating other effects of transmission gaps,
  a corresponding anticipated variation of the transmission power is applied, and
  said anticipated variation of the transmission power corresponds to an approximate value of said target value variation obtained by a process of approximation from said second component.

The first component, intended to compensate the effects of the bit rate increase in the compressed mode, can be known equally well to the sender, for example the downlink B node, and the receiver, for example the downlink user equipment. This first component is therefore not generally the cause of the signaling problems considered here. Those problems are caused by the second component, which is used for compensating all the effects of the compressed mode other than the increase in the bit rate, for example degradation due to the interruption of power control in the compressed mode, degradation of coding in the case of the "punched" compressed mode, etc. One solution to the signaling problems considered here would be to ignore this second component when determining the anticipated variation of the transmission power for the internal power control loop. This is not the optimum solution, however, and the applicant has found that a solution which takes the second component into account, even if it uses no more than an approximation of the second component, obtains better results and degrades performance less, and also reduces the amount of signaling required, which is also a very important objective in these systems.

The above kind of approximation can be obtained by any means, for example by simulation, by statistical methods from values previously obtained, etc.

Also, for a given transmission direction, an approximate value of said second component can be obtained from the second component for the opposite transmission direction.

Because the uplink and downlink propagation channels can generally be considered to have the same characteristics, the second component for the opposite transmission direction can be considered as constituting a good approximation of the second component for the transmission direction concerned. This fact can advantageously be used to solve the problems previously mentioned. For example, because the second component for the uplink target value variation is signaled by the radio network controller to the B node, the B node can then use that second component for the anticipated variation of the transmission power in the downlink direction, without it being necessary for the radio network controller to signal it any other value.

Note further that the mode of obtaining said approximate value of the target value variation does not preclude that value corresponding to the exact value of the target value variation. Note further that neither does approximation preclude a null value for the second component. Said target value used by said power control algorithm (internal loop algorithm) can itself be adjusted by an adjustment algorithm (external loop algorithm) as a function of the required quality of service and said target value variation is then intended, in the case of change to the required quality of service, to anticipate the corresponding target value variation adjusted by said adjustment algorithm.

The following description of the present invention considers the situation of a variation in the target value (or of a change to the required quality of service) corresponding to a change of transmission mode from the uncompressed mode to the compressed mode. The same principles would apply for a change of transmission mode from the compressed mode to the uncompressed mode.

The example discussed relates to transmission in the uplink direction, i.e. from B node to the user equipment.

The example discussed relates to the DPDCH and the DPCCH as defined in the UMTS, the transmission power of each of the TFCI, TPC and Pilot fields of the DPCCH being offset relative to the transmission power of the DPDCH by a respective offset PO1, PO2, PO3.

Of course, the invention is not limited to this example.

The target value variation $\Delta$SIR can be obtained as described in European Patent Application No. 00400357.0 filed 8 Feb. 2000 by the applicant.

One feature of a system like the UMTS is the possibility of transporting more than one service on the same connection, i.e. of having more than one transport channel (TrCH) on the same physical channel. The transport channels are treated separately in accordance with a channel coding scheme, including error detecting coding, error correcting coding, bit rate adaptation and interleaving, before time-division multiplexing them to form a coded composite transport channel (CCTrCH) carried by one or more physical channels. Processing in accordance with this channel coding scheme is effected at the level of transmission time intervals (TTI). In this channel coding scheme, bit rate adaptation includes the techniques of "puncturing" and "repetition"; also, frame interleaving is applied over the TTI length (interleaving depth). Each TTI is then segmented into frames and time division multiplexing and distribution to the physical channels are then effected frame by frame. Each of the transport channels TrCHi (i=1 to n) multiplexed to form a CCTrCH has its own TTI length TTIi. More information on these aspects of the UMTS can be found in the document 3G TS25 212 V3.0.0 published by 3GPP.

As described in the second earlier patent application cited above, the value $\Delta$SIR can be obtained from the expression:

$$\Delta SIR = \max(\Delta SIR1\_compression, \ldots, \Delta SIRn\_compression) + \Delta SIR\_coding$$

in which n is the number of TTI lengths for all the TrCh of a CCTrCh, $F_i$ is the length in frames of the ith TTI, $\Delta$SIR_coding is defined as follows:
$\Delta$SIR_coding=DeltaSIR for compressed frames,
$\Delta$SIR_coding=DeltaSIRafter for recovery frames,
$\Delta$SIR_coding=0 otherwise, and $\Delta SIRi\_compression$ is defined as follows:
if the frames are compressed by "puncturing":
$\Delta SIRi\_compression=10 \log(N*F_i/(N*F-TGL_i))$ if there is a transmission gap in the current TTI of length $F_i$ frames, where $TGL_i$ is the transmission gap length in time intervals (either the duration of a single transmission gap or the sum of the durations of several transmission gaps) in the current TTI of length $F_i$ frames,
$\Delta SIRi\_compression=0$ otherwise.
if the frames are compressed by reducing the spreading factor:
$\Delta SIRi\_compression=10 \log(R_{CF}/R)$ for each compressed frame, where R is the instantaneous net bit rate before and after the compressed frame and $R_{CF}$ is the instantaneous net bit during the compressed frame. Note that the expression "instantaneous net bit rate" refers to the fact that the period used to calculate the bit rate for a compressed frame is not the whole period of the frame but only the portion of the frame period in which data is transmitted; for example, the value of $10 \log (R_{CF}/R)$ in the downlink direction is 3 dB in the UMTS, in which bit rate adaptation (rate matching) is the same for compressed and uncompressed frames, when the compressed mode obtained by halving the spreading factor is used. In the uplink direction, however, the value of $\Delta SIRi\_compression$ is $10 \log((15-TGL)/15)$, because bit rate adaptation is not the same for compressed and uncompressed frames. Also, if the information bit rate is merely reduced, so that there is no need to compress the frames by modifying the "repetition"/"puncturing" rate and/or the spreading factor, which is known as "higher layer scheduling", the term $\Delta SIRi\_compression$ is equal to zero.
$\Delta SIRi\_compression=0$ otherwise.

Max ($\Delta SIR1\_compression, \ldots, \Delta SIRn\_compression$) in the above algorithm corresponds to said first component and $\Delta SIR\_coding$ corresponds to said second component for said target value variation.

In this algorithm the second component $\Delta SIR\_coding$ has different values DeltaSIR and DeltSIRafter for compressed and recovery frames, respectively.

Other algorithms or variants of the above algorithm could be envisaged, in particular, and as also described in the second earlier patent application previously cited:

In the particular case where a transmission gap begins in a first frame and finishes in a consecutive second frame, which corresponds to the "double-frame method" in the UMTS, the second compressed frame, with the second part of the transmission gap, is considered as a recovery frame ($\Delta$SIR_coding=DeltaSIRafter). In this case, the first frame that follows the two consecutive frames in question is not considered as a recovery frame ($\Delta$SIR_coding=0).

Alternatively, the second compressed frame could be considered a compressed frame ($\Delta$SIR_coding=DeltaSIR) and the first frame that follows the two consecutive frames concerned could be considered a recovery frame ($\Delta$SIR_coding=DeltaSIRafter)

The second compressed frame could instead be considered a compressed frame and a recovery frame (ΔSIR_coding=DeltaSIR+DeltaSIRafter, or any other combination), or more generally, and to reduce the amount and complexity of the signaling required, the component ΔSIR_coding could be determined on the basis of the values DeltaSIR and DeltaSIRafter, without it being necessary to signal any other value.

Considering, for example, the situation of the DPDCH and the pilot channel of the DPCCH, or more generally the case of at least one data channel and one control channel, whose transmission power is controlled simultaneously by the same power control algorithm, and such that the transmission power of the control channel is offset relative to the transmission power of the data channel, in according with the invention:

in the event of target value variation, anticipated variations of the transmission power of the data channel and/or the transmission power of the control channel and/or the offset of the transmission power of the control channel relative to the transmission power of the data channel are applied to obtain an anticipated variation of the transmission power of the data channel that corresponds to said approximate value of the target value variation, and said anticipated variations of the transmission power of the data channel and/or the transmission power of the control channel and/or the offset of the transmission power of the control channel relative to the transmission power of the data channel can advantageously also be determined so that the signal transmitted on the control channel has the same power before and after said target value variation and over the same reference period.

Note that "control channel" means either a channel or a field in the case of a control channel including a plurality fields such as the Pilot, TPC and TFCI fields of the DPCCH in the UMTS.

Using the following notation:

$N_1$ is the number of bits of the pilot signal in the last time interval (reference period) before the target SIR changes and $N_2$ is the number of bits of the pilot signal in the first time interval after the target SIR changes, $SF_1$ and $SF_2$ are the respective spreading factors in these two time intervals (in the case of the compressed mode obtained by reducing the spreading factor), and $PO3_1$, and $PO3_2$ are the values (in dB) taken by PO3 in the respective time intervals, $PO3_2$ can be obtained as follows, for example:

$$PO3_2 = PO3_1 + 10\log\left(\frac{N_1 SF_1}{N_2 SF_2}\right) - \Delta SIR$$

The above expression is obtained by writing:

$N_1 SF_1 P_1 = N_2 SF_2 P_2$ in which $P_1$ and $P_2$ are transmission powers of the pilot signal in the respective time intervals concerned.

Note that in the UMTS, for the downlink direction, the following expression is equal to zero:

$$10\log\left(\frac{N_1 SF_1}{N_2 SF_2}\right)$$

Figure 4:
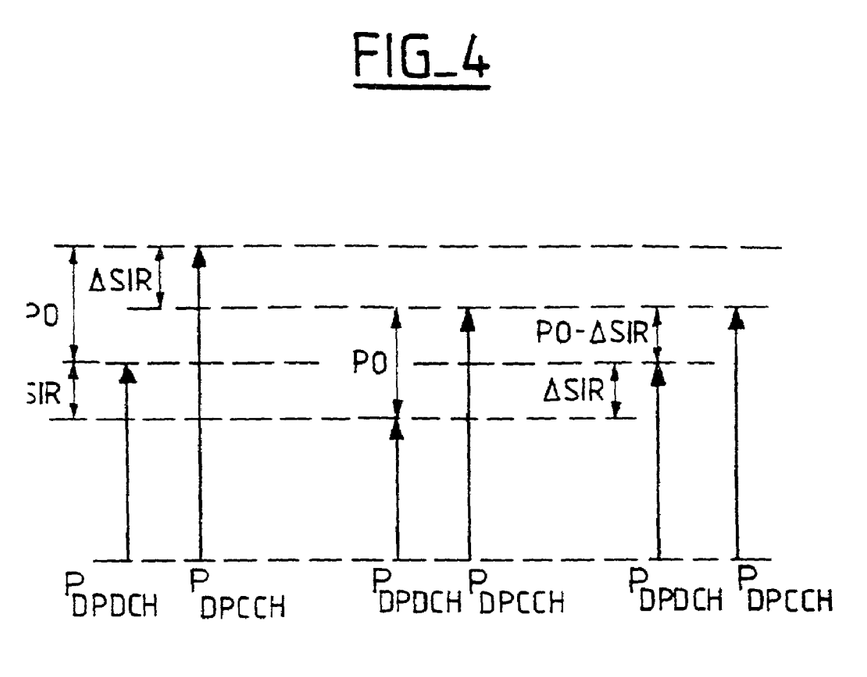
FIG. 4 is a diagram showing two embodiments of power control in accordance with the invention in the case of a data channel and a control channel.

As shown diagrammatically in FIG. 4, two methods can be used to apply anticipated variations of the transmission power to the data and control channels.

FIG. 4 corresponds more particularly to the situation in which the following expression is equal to zero, for example:

$$10\log\left(\frac{N_1 SF_1}{N_2 SF_2}\right)$$

Using a method shown in the left-hand part of FIG. 4, the transmission power $P_{DPDCH}$ of the data channel and the transmission power $P_{DPCCH}$ of the control channel are reduced by an amount corresponding to said approximate value of the target value variation ΔSIR.

Accordingly, using this method, the transmission power of the control channel is modified but the offset of the transmission power of the control channel relative to the transmission power of the data channel is not modified.

Using a method shown in the right-hand part of FIG. 4, the offset PO of the transmission power of the control channel relative to the transmission power of the data channel is reduced by an amount corresponding to said approximate value of the target value variation ΔSIR.

Accordingly, using this method, the transmission power of the control channel is not modified but the offset of the transmission power of the control channel relative to the transmission power of the data channel is modified.

The central part of FIG. 4 shows the situation in which there is no target value variation.

Of course, FIG. 4 would also have to be modified if the following expression were not equal to zero:

$$10\log\left(\frac{N_1 SF_1}{N_2 SF_2}\right)$$

The same method as is used for the offset PO3 can be used for the respective offsets PO1 and PO2 relating to the transmission power of the fields TFCI and TPC.

The same variation obtained for the offset PO3 can also be applied for the offsets PO1 and PO2. One advantage of this is that the ratios PO1/PO3 and PO2/PO3 do not change, which can be useful if PO1=PO2=PO3, for example, because this preserves the relationship of equality after application of said anticipated variations of the transmission power or the corresponding variations of the transmission power offset.

One example of a method in accordance with the invention can be described by means of the following algorithm.

This example corresponds more particularly to the second method shown in FIG. 4, and to the situation in which the same variation is applied for the offsets PO1, PO2, PO3. This example also corresponds more particularly to the situation of two successive transmission gaps forming the same transmission gap pattern, the parameters DeltaSIR and DeltaSIRafter for these two transmission gaps being respectively denoted DeltaSIR1, DeltaSIRafter1 and DeltaSIR2, DeltaSIRafter2.

During the compressed and recovery frames, the power offsets PO1, PO2, PO3 are reduced by:

max (ΔSIR1_compression, . . . ΔSIRn_compression)+ ΔSIR_coding where n is the number of transmission time interval TTI lengths for all the transport channels TrCh of a coded composite transport channel CCTrCh, ΔSIR_coding is defined as follows:

ΔSIR_coding=DeltaSIR1 for compressed frames corresponding to the first transmission gap of said pattern, ΔSIR_coding=DeltaSIRafter1 for recovery frames corresponding to the first transmission gap of said pattern, ΔSir_coding=DeltaSIR2 for compressed frames corresponding to the second transmission gap of said pattern, and ΔSIRi_coding=DeltaSIRafter 2 for recovery frames corresponding to the second transmission gap of said pattern, and ΔSIRi_compression is defined as follows:

if the frames are compressed by halving the spreading factor:

ΔSIRi_compression=3 dB for the compressed frames, and
ΔSIRi_compression=0 dB otherwise.

if the frames are compressed by "puncturing":

ΔSIRi_compression=10 log($15*F_i/(15*F_i-TGL_i)$) if there is a transmission gap in the current TTI of length $F_i$ frames, where $TGL_i$ is the transmission gap length in time intervals (either the duration of a single transmission gap or the sum of the durations of several transmission gaps) in the current TTI of length $F_i$ frames, and ΔSIRi_compression=0 otherwise.

if the frames are compressed by the higher layer scheduling method:

ΔSIRi_compression=0 dB for the compressed and recovery frames.

In the particular case of the double-frame method, the second compressed frame (with the second part of the transmission gap) can be considered a recovery frame (ΔSIR_coding–DeltaSIRafter1 or ΔSIR_coding=DeltaSIRafter2). Thus, in this case, the first frame that follows the two consecutive compressed frames is not considered a recovery frame (the power offsets PO1, PO2, PO3 have the same values as in the normal mode).

Generally speaking, said anticipated variations of the transmission power and/or the transmission power offset must be applied before transmitting the first time interval that will be received after applying the target value variation ΔSIR, or as soon as possible thereafter.

Figure 5:
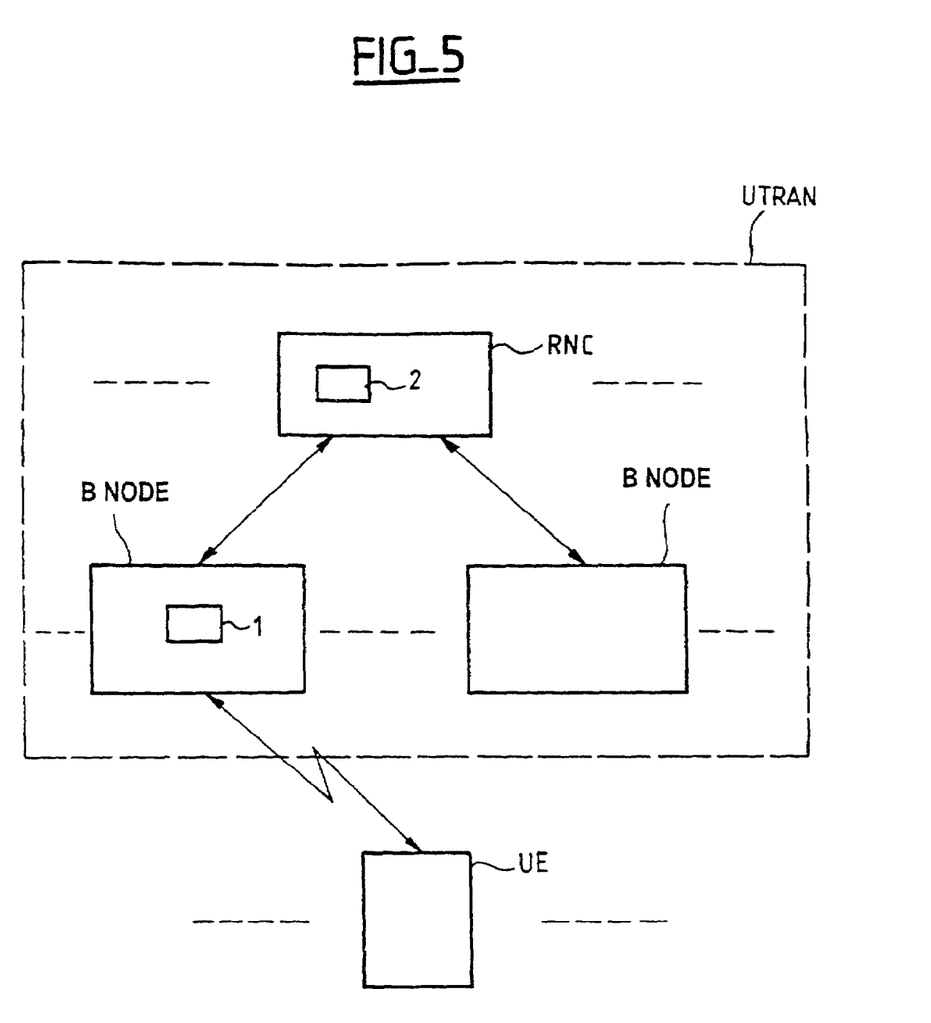
FIG. 5 is a diagram showing one example of the means to be provided in a mobile radio system for implementing a downlink power control method in accordance with the invention.

FIG. 5 is a diagram showing one example of the means to be provided in a mobile radio system to implement a downlink power control method in accordance with the invention.

Accordingly, and by way of example only, the following are to be provided for the downlink direction, as shown diagrammatically in the figure:

in a B node, means 1 for applying an anticipated variation of the transmission power offset, as determined by the algorithm described above, for example, in the event of variation in the downlink target value (as determined in the user equipment, for example using the algorithm referred to above), in a radio network controller, means 2 for signaling to a B node, which is considered the sender for the downlink direction, parameters DeltaSIR and DeltaSIRafter enabling the B node to determine an approximate downlink target value variation and therefore an anticipated variation of the downlink transmission power offset for the internal power control loop. These signaling means can therefore be the same as those already provided for signaling the same parameters to the B node, which is considered the receiver for the uplink direction, which parameters are needed to enable the B node to determine the uplink target value variation to be applied for the external power control loop.

Figure 6:
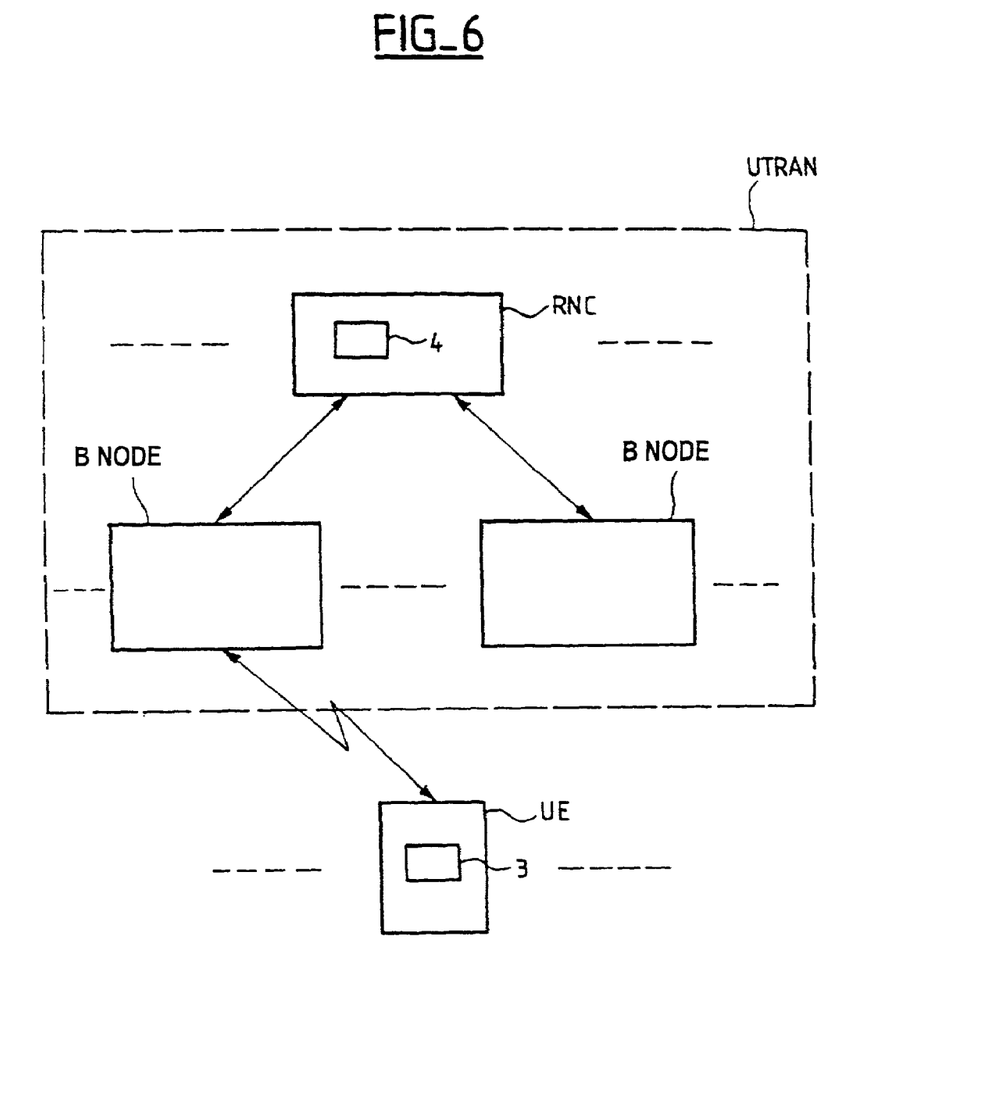
FIG. 6 is a diagram showing one example of the means to be provided in a mobile radio system for implementing an uplink power control method in accordance with the invention.

FIG. 6 is a diagram showing one example of the means to be provided in a mobile radio system to implement an uplink power control method in accordance with the invention.

Accordingly, as shown diagrammatically and by way of example only in the figure, the following are to be provided for the uplink direction:

in a user equipment, means 3 for applying an anticipated variation of the transmission power offset, as determined by the algorithm described above, for example, in the event of uplink target value variation (as determined in the B node, for example by the algorithm referred to above), in the network, for example in the radio network controller, means 4 for signaling to a user equipment, which is considered the sender for the uplink direction, the downlink parameters DeltaSIR and DeltaSIRafter, enabling the user equipment to determine an approximate uplink target value variation and therefore an anticipated variation of the uplink transmission power offset for the internal power control loop. The signaling means can therefore be the same as those already provided for signaling the same parameters to the user equipment, which is considered the receiver for the downlink direction, which parameters are needed to enable the user equipment to determine the downlink target value variation to be applied for the external power control loop.

The example described with reference to FIGS. 5 and 6 therefore corresponds more particularly to the situation in which, for a given transmission direction, an approximate value of said second component is obtained from the second component for the opposite transmission direction. Other examples are naturally possible.

The parameters DeltaSir and DeltaSIRafter which are signaled by the radio network controller to the B node and to the user equipment can also be the same for the B node and for the user equipment. This ensures that the anticipated variation of the transmission power is the same as the target value variation for each transmission direction.

Furthermore, other examples that do not depart from the scope of the present invention are feasible. In particular, in a system like the UMTS, a B node may not communicate with a radio network controller, referred to as the serving radio network controller, in which the external power control loop is implemented, directly but via another radio network controller, referred to as the drift radio network controller (DRNC). Consequently, the present invention relates not only to the interface between the radio network controller and the B node, but also to the interface between radio network controllers, which interfaces are respectively referred to as "Iub" and "Iur" in the UMTS.

The invention claimed is:

1. A method of controlling transmission power in a mobile radio system in which a power control algorithm controls transmission power as a function of a transmission quality target value, said method comprising the steps of:

in the event of a target value variation applied to compensate the effects of a compressed transmission mode in which transmission is interrupted during transmission gaps and the bit rate is increased correspondingly to compensate for the transmission gaps, wherein said target value variation includes a first component for compensating for the effects of said increased bit rate and a second component for compensating for other effects of transmission gaps, obtaining an approximate value of said target value variation, by approximation of said second component, and anticipatorily varying the transmission power by an amount corresponding to said approximate value of said target value variation.

2. A method according to claim 1, comprising a step of obtaining an approximate value of said second component for a given transmission direction, from the second component for the opposite transmission direction.

3. A method according to claim 1, wherein said power control algorithm simultaneously controls the transmission power of at least two channels, including a data channel and a control channel, as a function of a transmission quality target value, and the transmission power of said control channel is offset relative to the transmission power of said data channel, said method comprising a step of applying anticipated variations of at least one of the transmission power of the data channel, the transmission power of the control channel and the offset of the transmission power of the control channel relative to the transmission power of the data channel, in order to obtain an anticipated variation of the transmission power of the data channel that corresponds to said approximate value of the target value variation.

4. A method according to claim 3, wherein, in the event of target value variation, said anticipated variations of at least one of the transmission power of the data channel, the transmission power of the control channel and/or of the offset of transmission power of the control channel relative to the transmission power of the data channel are determined so that the power of the signal transmitted on the control channel is the same before and after said target value variation and over the same reference period.

5. A method according to claim 3, wherein, in the event of target value variation, an anticipated variation of the offset of the transmission power of the control channel relative to the transmission power of the data channel is applied that corresponds to the opposite of said approximate value of the target value variation.

6. A method according to claim 3, wherein, in the event of target value variation, an anticipated variation of the transmission power of the data channel and the transmission power of the control channel is applied that corresponds to said approximate value of the target value variation.

7. A method according to claim 1, wherein said target value is adjusted by an adjustment algorithm as a function of a required quality of service and said target value variation is intended, in the event of a change to the required quality of service, to anticipate the corresponding target value variation adjusted by said adjustment algorithm.

8. A base station according to claim 7, comprising means for using said second component which is signaled to it by a base station controller, for obtaining said approximate value of the downlink target value variation.

9. A mobile radio system in which a power control algorithm controls transmission power as a function of a transmission quality target value, said mobile radio system comprising:
means for, in the event of a target value variation applied to compensate for the effects of a compressed transmission mode in which transmission is interrupted during transmission gaps and the bit rate is increased correspondingly to compensate for the transmission gaps, wherein said target value variation includes a first component for compensating for the effects of said increased bit rate and a second component for compensating for other effects of transmission gaps, obtaining an approximate value of said target value variation, by approximation of said second component, and
means for anticipatorily varying the transmission power by an amount corresponding to said approximate value of said target value variation.

10. A mobile radio system according to claim 9, wherein said transmission power control algorithm simultaneously controls the transmission power of at least two channels, including a data channel and a control channel, as a function of transmission quality target value, with the transmission power of said control channel offset relative to the transmission power of said data channel, said mobile radio system comprising means for applying anticipated variations of at least one of the transmission power of the data channel, the transmission power of the control channel and the offset of the transmission power of the control channel relative to the transmission power of the data channel in order to obtain said anticipatory variation of the transmission power of the data channel.

11. A mobile radio system according to claim 10, further comprising means such that, in the event of target value variation, said anticipated variations of the at least one of the transmission power of the data channel, the transmission power of the control channel and the offset of the transmission power of the control channel relative to the transmission power of the data channel cause the signal transmitted on the control channel to have the same power before and after said target value variation and over the same reference period.

12. A mobile radio system according to claim 9, comprising means for applying, in the event of target value variation, an anticipated variation of the offset of the transmission power of the control channel relative to the transmission power of the data channel that corresponds to the opposite of said approximate value of the target value variation.

13. A mobile radio system according to claim 9, comprising means for applying, in the event of target value variation, an anticipated variation of the transmission power of said data channel and the transmission power of said control channel that corresponds to said approximate value of the target value variation.

14. A system according to claim 9, comprising means for obtaining an approximate value of said second component for a given transmission direction, from the second component for the opposite transmission direction.

15. A base station in which a power control algorithm controls a downlink transmission power as a function of a transmission quality target value, said base station comprising:
means for, in the event of a target value variation applied to compensate for the effects of a compressed transmission mode in which transmission is interrupted during transmission gaps and the bit rate is increased correspondingly to compensate for the transmission gaps, wherein said target value variation includes a first component for compensating for the effects of said increased bit rate and a second component for compensating for other effects of transmission gaps, obtaining an approximate value of said target value variation, by approximation of said second component, and
means for anticipatorily varying the transmission power by an amount corresponding to said approximate value of said target value variation.

16. A base station according to claim 15, wherein said transmission power control algorithm simultaneously controls the transmission power of at least two channels, including a data channel and a control channel, as a function of transmission quality target value, with the transmission power of said control channel offset relative to the transmission power of said data channel, said base station comprising:
means for applying, in the event of target value variation, anticipated variations of at least one of the transmission power of the data channel, the transmission power of the control channel and the offset of the transmission power of the control channel relative to the transmission power of the data channel, to obtain said anticipatory variation of the transmission power of the data channel.

17. A base station according to claim 16, further comprising means such that, in the event of target value variation, said anticipatory variations cause the signal transmitted on the control channel to have the same power before and after said target value variation and over the same reference period.

18. A base station according to claim 15, comprising means for applying an anticipatory variation of the offset of the transmission power of the control channel relative to the transmission power of the data channel that corresponds to the opposite of said approximate value of the target value variation.

19. A base station according to claim 15, comprising means for applying an anticipatory variation of the transmission power of said data channel and the transmission power of said control channel that corresponds to said approximate value of the target value variation.

20. A base station according to claim 15, comprising means for using said second component which is signaled to it by a base station controller for the purposes of uplink power control to determine said approximate value of the downlink target value variation.

21. A base station according to claim 15, comprising means for obtaining an approximate value of said second component for the downlink, from the second component for the uplink.

22. A mobile station in which a power control algorithm controls an uplink transmission power as a function of a transmission quality target value, said mobile station comprising:
   means for, in the event of a target value variation applied to compensate for the effects of a compressed transmission mode in which transmission is interrupted during transmission gaps and the bit rate is increased correspondingly to compensate for the transmission gaps, wherein said target value variation includes a first component for compensating for the effects of said increased bit rate and a second component for compensating for other effects of transmission gaps, obtaining an approximate value of said target value variation, by approximation of said second component, and
   means for anticipatorily varying the transmission power by an amount corresponding to an approximate value of said target value variation.

23. A mobile station according to claim 22, further comprising means for using said second component which is signaled to it by a base station controller for the purposes of downlink power control to determine said approximate value of the uplink target value variation.

24. A mobile station according to claim 22, comprising means for obtaining an approximate value of said second component for the uplink, from the second component for the downlink.

25. A mobile station wherein a transmission power control algorithm simultaneously control the transmission power of at least two channels, including a data channel and a control channel, as a function of transmission quality target value, with the transmission power of said control channel offset relative to the transmission power of said data channel, said mobile station comprising:
   means for applying, in the event of target value variation, anticipated variations of at least one of the transmission power of the data channel, the transmission power of the control channel and the offset of the transmission power of the control channel relative to the transmission power of the data channel, to obtain an anticipated variation of the data channel transmission power; and
   means such that in the event of target value variation said anticipated variations cause the signal transmitted on the control channel to have the same power before and after said target variation and over the same reference period.

26. A mobile station wherein a transmission power control algorithm simultaneously control the transmission power of at least two channels, including a data channel and a control channel, as a function of transmission quality target value, with the transmission power of said control channel offset relative to the transmission power of said data channel, said mobile station comprising:
   means for applying, in the event of target value variation, anticipated variations of at least one of the transmission power of the data channel, the transmission power of the control channel and the offset of the transmission power of the control channel relative to the transmission power of the data channel, to obtain an anticipated variation of the data channel transmission power; and
   means for generating an approximate value of said target value variation, and wherein said means for applying applies an anticipated variation of the offset of the transmission power of the control channel relative to the transmission power of the data channel that corresponds to the opposite of said approximate value of the target value variation.

27. A mobile station wherein a transmission power control algorithm simultaneously control the transmission power of at least two channels, including a data channel and a control channel, as a function of transmission quality target value, with the transmission power of said control channel offset relative to the transmission power of said data channel, said mobile station comprising:
   means for applying, in the event of target value variation, anticipated variations of at least one of the transmission power of the data channel, the transmission power of the control channel and the offset of the transmission power of the control channel relative to the transmission power of the data channel, to obtain an anticipated variation of the data channel transmission power; and
   means for applying an anticipated variation of the transmission power of said data channel and the transmission power of said control channel that corresponds to said approximate value of the target value variation.

28. A base station controller for a mobile radio system in which a power control algorithm controls transmission power as a function of a transmission quality target value, and in which a target value variation is applied to compensate for the effects of a compressed transmission mode in which transmission is interrupted during transmission gaps and the bit rate is increased correspondingly to compensate for the transmission gaps, said target value variation including a first component for compensating the effects of said increased bit rate and a second component for compensating other effects of transmission gaps, said base station controller comprising means for signaling the same value for said second component for both transmission directions to a base station and to a mobile station.

29. A base station, comprising:
   means for controlling a downlink transmission power as a function of a transmission quality target value,
   means for using parameters signaled to said base station for the uplink, to determine a target value variation applied in compressed mode, and means for applying a power offset to said downlink transmission power, corresponding to the thus determined target value variation.

30. A base station according to claim 29, wherein said parameters signaled to said base station for the uplink include:

a first parameter (DeltaSIR1, DeltaSIR2) for a compressed frame, and a second parameter (DeltaSIRafter1, DeltaSIRafter2) for frame following said compressed frame.

31. A base station according to claim 30, wherein said frame following said compressed frame is the second one of two consecutive compressed frames, with transmission gap beginning in the first one of said two frames and finishing in the second one of said two frames.

* * * * *

UNITED STATES PATENT AND TRADEMARK OFFICE
CERTIFICATE OF CORRECTION

PATENT NO. : 7,626,970 B2
APPLICATION NO. : 09/878269
DATED : December 1, 2009
INVENTOR(S) : Pascal Agin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Twenty-first Day of December, 2010

David J. Kappos
*Director of the United States Patent and Trademark Office*